United States Patent [19]

Fisher

[11] Patent Number: 4,591,251

[45] Date of Patent: May 27, 1986

[54] PROCESS CAMERA ADAPTER

[75] Inventor: Harrold Fisher, La Mesa, Calif.

[73] Assignee: Cubic Corporation, San Diego, Calif.

[21] Appl. No.: 721,149

[22] Filed: Apr. 8, 1985

[51] Int. Cl.[4] .......................... G03B 17/02; G03B 27/58
[52] U.S. Cl. ..................................... 354/159; 354/161; 354/210; 355/44; 355/72
[58] Field of Search ................. 354/83, 159, 161, 210, 354/174, 187, 188, 275, 276, 295; 355/64, 65, 44, 72, 73, 21; 352/79, 80

[56] References Cited

U.S. PATENT DOCUMENTS

| | | | |
|---|---|---|---|
| 3,160,083 | 12/1964 | Neumeister | 355/72 |
| 3,165,993 | 1/1965 | Stern | 354/161 X |
| 3,740,138 | 6/1973 | Blatherwick | 354/161 X |
| 3,832,728 | 8/1974 | Faris et al. | 354/210 |
| 3,920,333 | 11/1975 | Walley, Jr. | 355/76 |
| 4,029,412 | 6/1977 | Spence-Bate | 355/64 |
| 4,074,935 | 2/1978 | Spence-Bate | 355/46 |
| 4,081,809 | 3/1978 | Kuboshima | 354/199 |

*Primary Examiner*—William B. Perkey
*Attorney, Agent, or Firm*—Brown, Martin & Haller

[57] ABSTRACT

A device for adapting a process or copy camera so that it can be used to expose smaller film employs a cover member that is shaped and dimensioned for mounting on a conventional process or copy camera back to cover the frame opening over which a sheet of film is normally placed for exposure. A recessed portion in the cover member extends through the frame opening to define a secondary frame opening in a selected focal plane ahead of the camera back, and components are included for removably mounting the cover member on the camera back and for holding film over the secondary frame opening for exposure.

9 Claims, 6 Drawing Figures

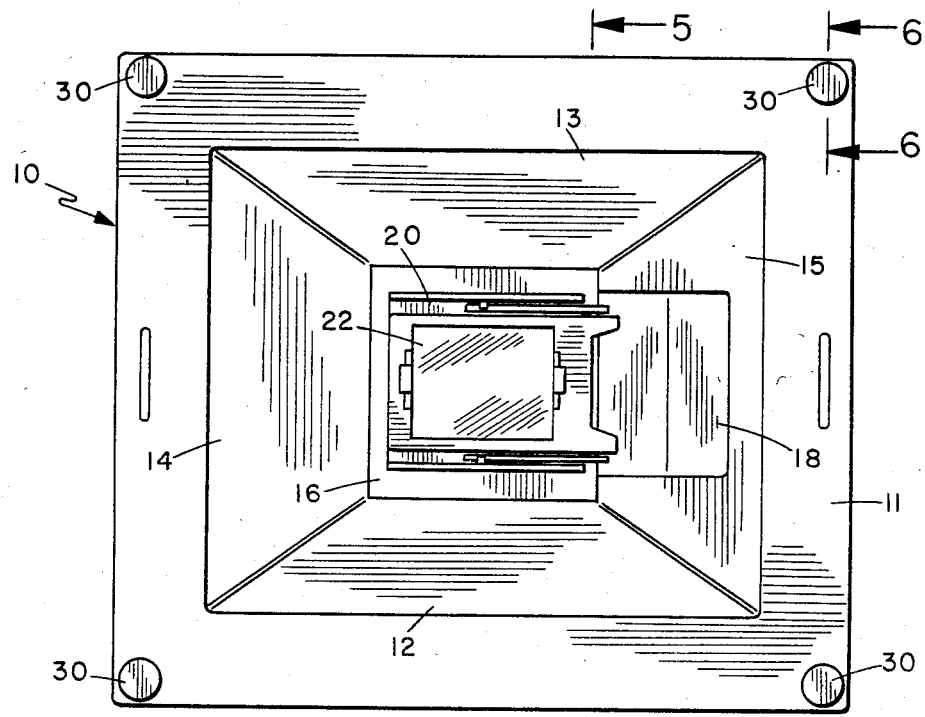
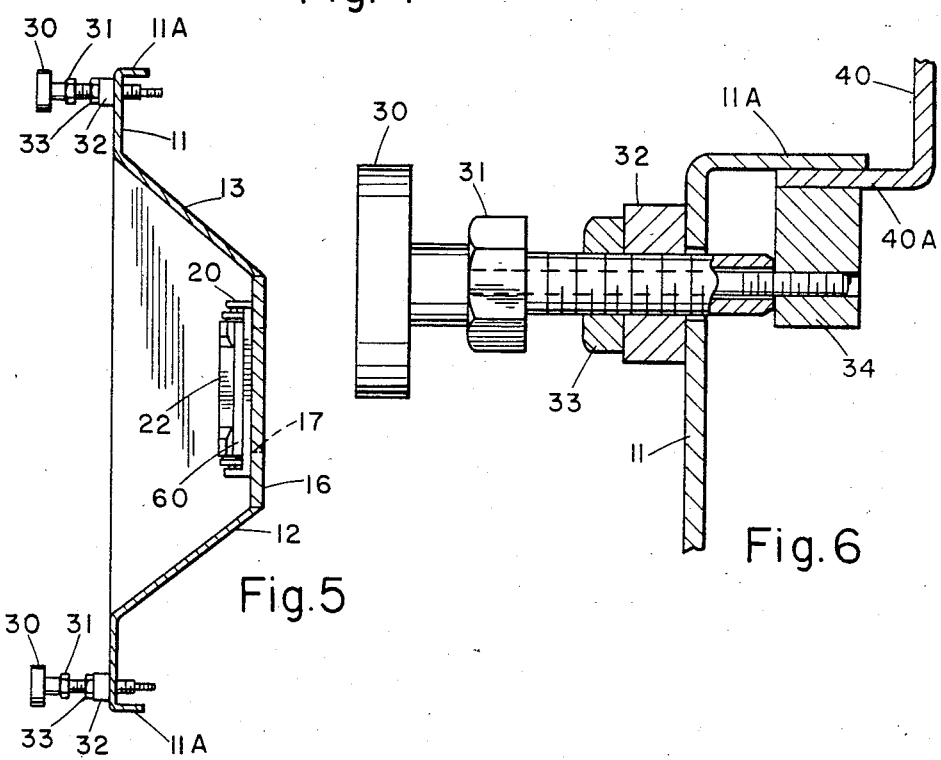

PROCESS CAMERA ADAPTER

BACKGROUND OF THE INVENTION

This invention relates generally to photographic equipment and particularly to a device for adapting a conventional process or copy camera so that it can be used to expose smaller film.

Photographic equipment of the type known interchangeably as a process camera or copy camera is used extensively in many commercial applications for exposing relatively large sheets of film. Able to achieve precise focusing and high resolution, these cameras and their copy-holding components take up the space of a small office while offering the facility for producing blueprints or large copies of other subject material.

Like the cameras we use for taking snapshots at home, a lens is used to focus an image along a light-tight optical path and through a frame opening to expose film mounted over the opening. Unlike the equipment we use at home, the process camera is considerably scaled up in size to expose sheets of film on the order of 20×30 inches or larger through a frame opening having the same general size.

The camera back itself is a six-foot-tall rigid panel that stands directly on the floor to define a frame opening at the four-foot level within easy reach of an operator behind the camera back. A sheet of film is placed over this frame opening for exposure with the aid of a small door mounted on the camera back. This is done with the lights extinguished by first placing the film against the door where it is sucked in place by a light vacuum, and then swinging the door closed over the frame opening. The film is then exposed in this position with an image directed through the frame opening from the front side of the camera back.

The subject to be photographed, or copy, is held at just the right distance on the front side of the camera back by adjustable copy-holding components that extend forward of the camera back some nine feet or so. An adjustable camera bellows extends from the frame opening toward the copy to the lens, and these components are adjusted from behind the camera back with a remote control unit to focus the desired image.

Thus, precise focusing and high resolution is achieved in a convenient-to-operate arrangement.

This arrangement works well in many situations, but it has certain drawbacks. For example, it does not lend itself to the use of smaller, less expensive film in those situations not requiring a large sheet of film, the frame opening being in the wrong focal plane for focusing on means of mounting smaller film such as is contained within a standard sheet film holder, roll film back, or polaroid back. Among other things, use of this other film would enable various prints to be inexpensively made. A 4×5 film size, for example, would permit use of a standard 4×5 enlarger with its capability to produce various sizes and quantities of prints. In addition, exposure tests and even final photographs could be made if the camera were adaptable to use with a standard polaroid film back. Also, the lights would not have to be extinguished to avoid unwanted film exposure.

Consequently, it is desirable to have an adapter for a process camera that would alleviate these drawbacks and enable exposure of smaller film, such as that within a standard sheet film holder, roll film back, or polaroid film back.

And it is desireable that the adapter be conveniently mounted on the camera and enable easy placement and removal of the smaller film to be exposed.

SUMMARY OF THE INVENTION

This invention recognizes the problems of the prior art and provides a new and improved process or copy camera adapter with the desired attributes.

A device constructed in accordance with the invention employs a cover member for mounting on a camera back of the type typically employed on process or copy cameras. This type of back defines a frame opening over which a sheet of film is normally placed for exposure, and the cover member is shaped and dimensioned for mounting on the camera back over the frame opening in place of a sheet of film.

The cover member includes a recessed portion. The recessed portion is shaped and dimensioned to both extend through the frame opening to a selected focal plane ahead of the camera back, and to define a secondary frame opening in the selected focal plane through which to expose film. Means such as clamp screws are provided for removably mounting the cover member on the camera back, and means such as a film holder frame is employed for holding film over the secondary frame opening for exposure.

Thus, the invention adapts a process camera so that it can be conveniently used in appropriate cases with smaller, less expensive film such as that in a standard sheet film holder, roll film back, polaroid film back, or standard 120 size roll film such as made by Calumet Photo. And, the usual need for extinguishing the lights while the film is being loaded is eliminated.

These and other objects and advantages of the invention will become more fully apparent upon reading the detailed description in conjunction with the accompanying drawings.

BRIEF DESCRIPTION OF THE DRAWINGS

FIG. 4 is an enlarged rear view of the device with a standard film holder attached;

FIG. 5 is a sectional view taken on line 5—5 of FIG. 4; and

FIG. 6 is an enlarged sectional view taken on line 6—6 of FIG. 4.

DETAILED DESCRIPTION

Figure 1:
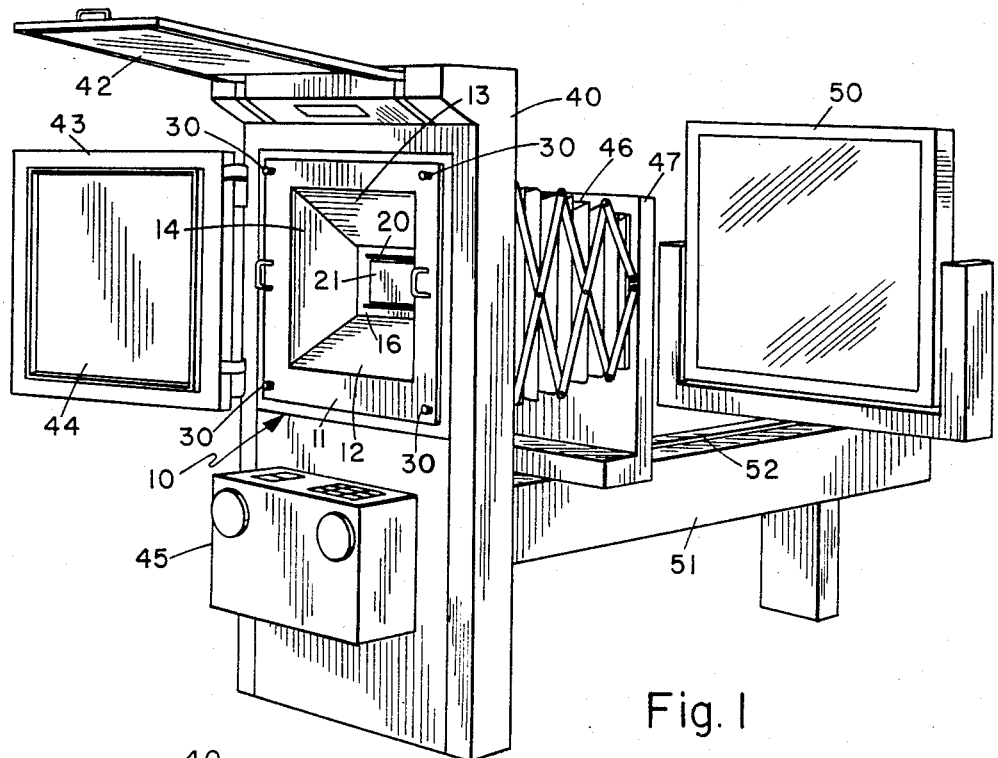
FIG. 1 of the drawings is a perspective view of a typical process or copy camera with a device constructed in accordance with the invention installed.
Figure 2:
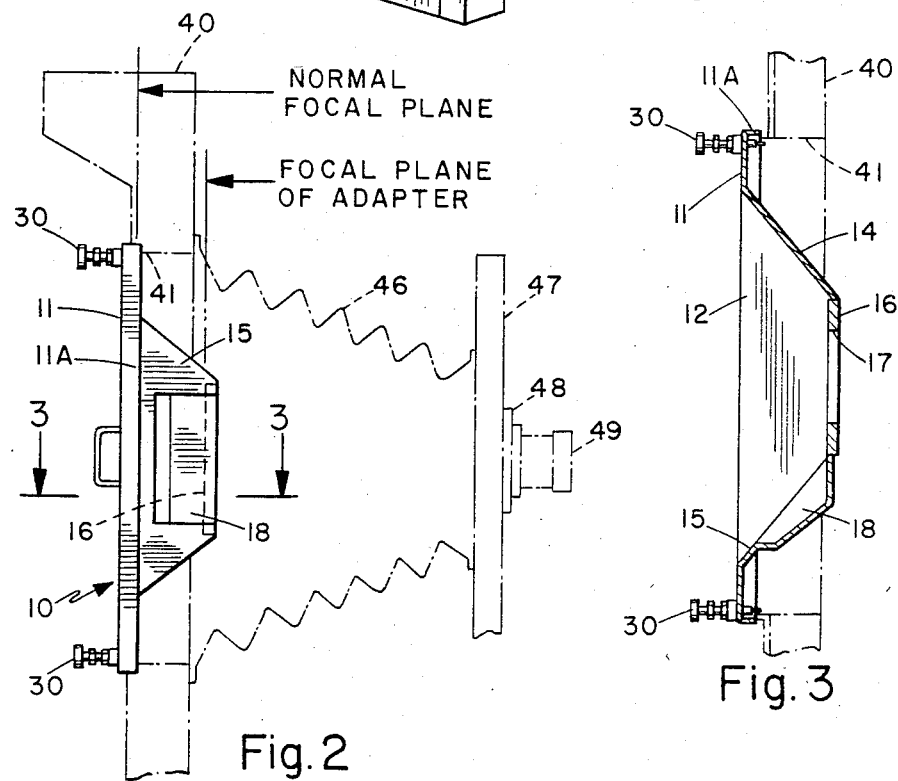
FIG. 2 is a side elevation view of the device, with portions of the camera indicated in broken line.
Figure 3:
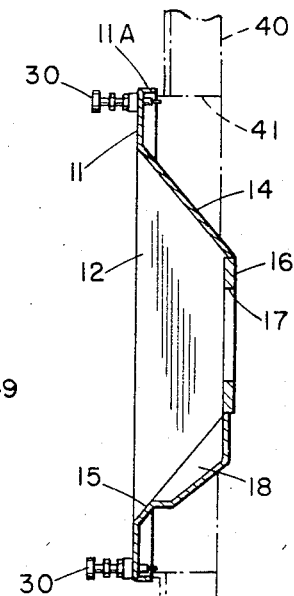
FIG. 3 is a sectional view taken on line 3—3 of FIG. 2.

A process camera adapter constructed in accordance with the invention is shown in FIG. 1 where it is referred to generally by reference numeral 10 and shown mounted on the back of a typical process camera. It includes a cover member 11 that has a recessed portion in the form of a truncated pyramid defined by sides 12–15 (side 15 is visible in FIG. 2). Film platform 16 is defined at the smaller end of the recess portion, and film holder frame 20 with focusing screen 21 is attached to it.

The adapter is attached by clamp screws or other suitable means to back 40 over frame opening 41 (FIG. 2) to provide a light-tight cover over the frame opening 4 and define a smaller secondary frame opening 17 through which to expose sheet film held within a standard sheet film holder.

Camera back 40 is a conventional process or copy camera back, such as the type available from DS America, Incorporated of Santa Ana, Calif., designated model number DS C-250-D. It is on the order of six feet high. It defines a frame opening 41 (FIG. 2) approximately 30 by 40 inches over which a standard sheet of film of the same apparoximate dimensions is normally placed for exposure.

Attached to the camera back is a large focusing screen 42 which can be swung into place over frame opening 41 for use in focusing an image. The large focusing screen is then swung out of the way in the position depicted in FIG. 1, a sheet of film is placed against vacuum film holder 44 on door 43, and the door is closed over the larger frame opening to put the film in position for exposure.

Bellows 46 extends forward of frame opening 41 to front case 47 on which is mounted lens board 48 and lens 49. These components are adjusted in position to focus an image of copy held by copy holder 50. Copy holder 50 is also adjustable on bed 51 along track 52 through use of control unit 45 to obtain the desired focus and image size.

The adapter is mounted over frame opening 41 to define a smaller secondary frame opening 17 in a selected focal plane ahead of the camera back. The adapter maintains a light tight fit over the larger frame opening so that light does not pass through frame opening 41 into bellows 46.

The adapter includes access well 18 formed in side 15 to allow a standard film holder to be slid into film holder frame 20. The access well provides clearance for the standard film holder.

Further details of the adapter are shown in FIGS. 4-6. Cover member 11 is conformably shaped and dimensioned to provide a light-tight fit over frame opening 41, the illustrated embodiment is roughly 31.5 by 27.5 inches, with the recess portion narrowing to a film platform approximately 10 by 10 inches.

The adapter is composed of an aluminum alloy shaped to define a smaller secondary frame opening in the film platform through which to expose film held within a standard film holder. A film holder frame is suitably mounted on the film platform over the smaller frame opening for use in receiving and holding a standard film holder in position over the secondary frame opening to enable exposure of film within the standard film holder.

The film holder frame includes focusing screen 21 upon which an image can be focused prior to exposing the film and after this is done a film holder is slid in place under spring-biased back member 22, access well 18 providing sufficient clearance for replacement and removal of the film holder.

FIG. 6 shows further details of the means used for removably mounting the cover member on the camera back. Clamp screw 30 fits freely through adjustment screw 31. Adjustment screw 31 is retained in nut 32 which is in turn welded or otherwise suitably attached to the adapter. Adjusting screw 31 is secured in the desired position by lock nut 33. Adjusting screw 31 bears against nut block 34 which is welded or otherwise suitably attached to outwardly-extending flange 40A. This enables leveling of the adapter with respect to frame opening 41 so that the secondary frame opening is properly aligned. With the adjusting screw in this position lock nut 33 is tightened to secure it in place. Clamp screw 30 is then simply screwed into nut block 34 to removably mount the adapter in a properly alig ed position. Flange 11A on cover member 11 mates with outwardly-extending flange 40A on camera back 40 to provide a light-tight fit.

Thus, in situations where it is desired to use a camera of the process or copy camera type for exposing film within a standard film holder, the adapter is mounted on the camera back with the larger focusing screen and vacuum film holder swung out of the way. In the process of mounting the adapter on the camera back, the four adjusting screws are adjusted to align the secondary frame opening in the film platform relative to the camera back to enable the correct exposure of film through this smaller frame opening.

With the camera adapter properly mounted on the back of the camera, the desired image is focused on focusing screen 21, a standard film holder is slid in place behind backing member 22, and then the film is exposed and removed for development.

When it is desired to once again use the camera for exposing large sheets of film, the adapter is simply unscrewed and removed and the camera used in the conventional manner.

As various changes may be made in the form, construction, and arrangement of the procedures and parts described herein, without departing from the spirit and scope of the invention and without sacrificing any of its advantages, it is to be understood that all matter herein is to be interpreted as illustrative and not in any limiting sense.

What is claimed is:

1. A device for adapting a process-type camera so that it can be used with smaller film, the device comprising:
   a cover member for mounting on a process-type camera having a back that defines a frame opening over which a sheet of film is normally placed for exposure, the cover member being shaped and dimensioned to fit on the camera back over the frame opening in place of a sheet of film and to include a recessed portion that is shaped and dimensioned to both extend through the frame opening to a selected focal plane ahead of the camera back and to define a secondary frame opening in the selected focal plane through which to expose film;
   mounting means for removably mounting the cover member on the camera back; and
   film holding means for holding film over the secondary frame opening for exposure.

2. The device recited in claim 1 wherein the cover member is a rectangularly-shaped plate having the same approximate length and width as a standard sheet of film normally placed over the frame opening for exposure.

3. The device recited in claim 1 wherein the recessed portion further comprises:
   a truncated pyramid attached to the plate, the truncated pyramid being shaped and dimensioned to extend through the frame opening to the selected focal plane ahead of the camera back.

4. The device recited in claim 1 wherein the mounting means includes means for removably screwing the cover member onto the back.

5. The device recited in claim 1, further comprising: means for holding a standard film holder over the secondary frame opening.

6. The device recited in claim 5 wherein the film holding means includes a standard film holder frame attached to the recessed portion in a position to receive and hold a standard film holder over the secondary frame opening.

7. The device recited in claim 1 which includes means for defining an enclosed optical path from the frame opening to the smaller frame opening.

8. The device recited in claim 1 which includes means for defining a focusing screen attached to the recessed portion over the secondary frame opening.

9. The device recited in claim 1 which includes means for aligning the secondary frame opening relative to the frame opening in the camera back.

* * * * *